United States Patent [19]

Suzuki et al.

[11] Patent Number: 4,679,926
[45] Date of Patent: Jul. 14, 1987

[54] MOTOR DRIVEN FILM REWIND DEVICE FOR CAMERA

[75] Inventors: Nobuyuki Suzuki, Kanagawa; Masami Shimizu, Tokyo, both of Japan

[73] Assignee: Canon Kabushiki Kaisha, Tokyo, Japan

[21] Appl. No.: 831,108

[22] Filed: Feb. 19, 1986

Related U.S. Application Data

[63] Continuation of Ser. No. 646,631, Aug. 31, 1984, abandoned.

[30] Foreign Application Priority Data

Sep. 1, 1983 [JP] Japan .................................. 58-159052

[51] Int. Cl.⁴ .............................................. G03B 1/18
[52] U.S. Cl. ................................ 354/173.11; 354/214; 354/217
[58] Field of Search ................. 354/468, 173.1, 173.11, 354/212, 214, 217, 218

[56] References Cited

U.S. PATENT DOCUMENTS

| 4,367,026 | 1/1983 | Terada et al. | 354/173.11 |
| 4,400,074 | 8/1983 | Akiyama et al. | 354/214 |
| 4,474,442 | 10/1984 | Shiozawa et al. | 354/173.11 |
| 4,477,163 | 10/1984 | Matsumoto et al. | 354/214 |
| 4,482,227 | 11/1984 | Shiozawa et al. | 354/173.11 |
| 4,494,842 | 1/1985 | Kimura et al. | 354/214 |
| 4,494,843 | 1/1985 | Kobayashi et al. | 354/214 |

FOREIGN PATENT DOCUMENTS

| 0016432 | 1/1982 | Japan | 354/214 |
| 0016431 | 1/1982 | Japan | 354/214 |

Primary Examiner—Russell E. Adams
Attorney, Agent, or Firm—Toren, McGeady & Associates

[57] ABSTRACT

In the disclosed film rewind device a detecting switch detects the movement of film which is taken up on a spool during the process of electrically rewinding the film into a cartridge and a timer automatically brings the film rewinding operation to a stop a predetermined period of time after a detecting switch ceases detecting the film movement. The period of time set at the timer is shortened in response to even a slight degree of film movement after the predetermined period of time.

17 Claims, 4 Drawing Figures

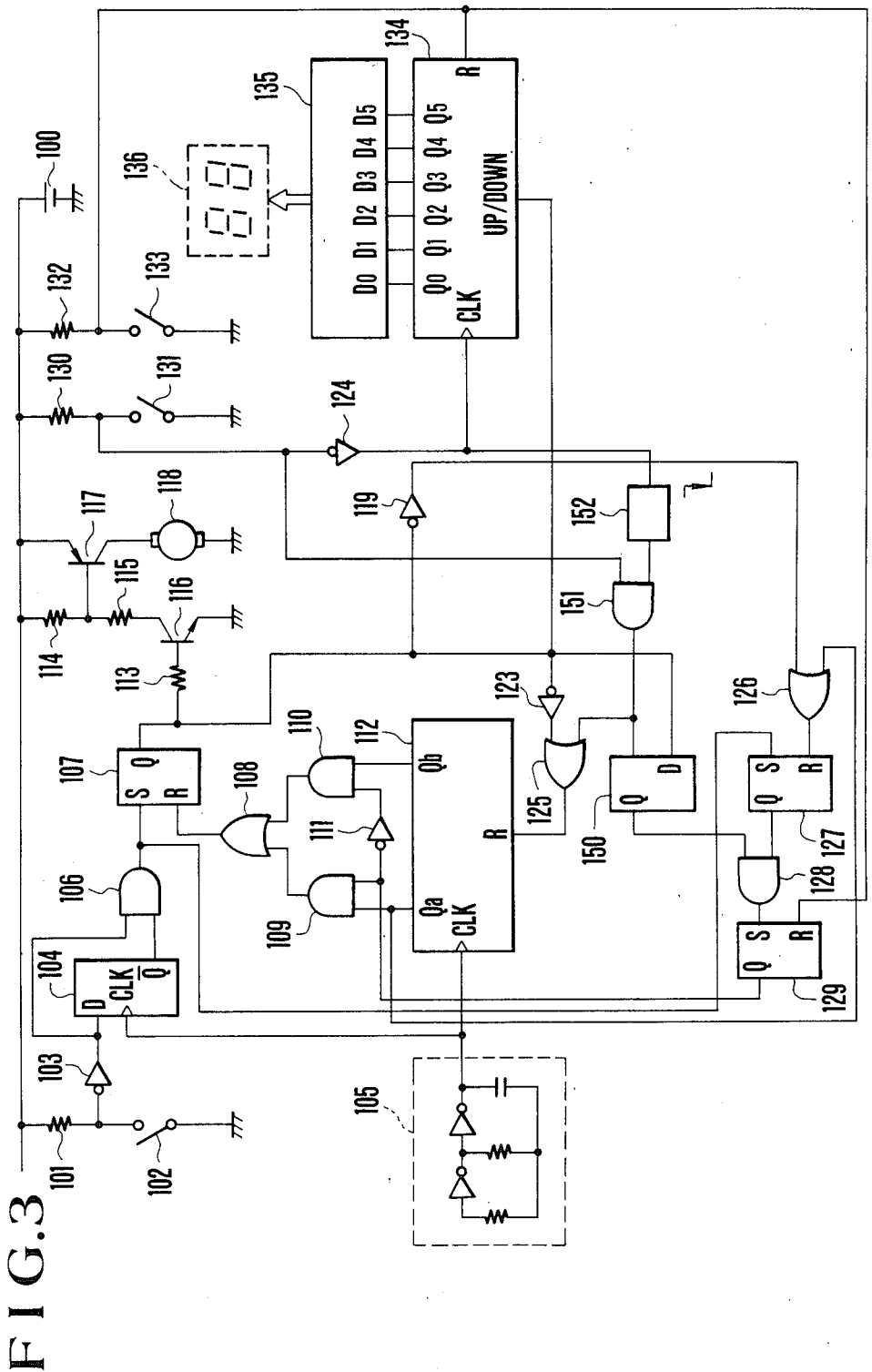
F I G. 3

MOTOR DRIVEN FILM REWIND DEVICE FOR CAMERA

This is a continuation of application Ser. No. 646,631, filed Aug. 31, 1984 (abandoned 2/19/86).

BACKGROUND OF THE INVENTION

1. Field of the Invention

This invention relates to a motor-driven film rewind device for a camera and more particularly to a device having a timer circuit which detects the end of a film rewinding operation and automatically brings the latter to an end.

2. Description of the Prior Art

Conventional film rewinding devices for cameras includes the kind which increase the content of a film counter according to the quantity of film taken up and decrease the content according to the quantity of film rewound during a film rewinding operation. The film rewinding operation is automatically brought to a stop when the content of the film counter reaches a predetermined value.

Generally, in loading a camera with a film, the perforations provided in the film engage a sprocket and one end of the film is wound round a spool. Then, about two frames of film are fed in a blank state before the back cover of the camera is closed. In this instance, the film counter becomes operative when the back cover is closed. In rewinding the film, therefore, a portion of the film still remains on the spool even when the rewinding operation comes to a stop with the content of the film counter having been reduced to a predetermined value by a substraction process. In this condition, the film cannot be readily taken out the camera.

In one known system a switch at a film feeding rail shifts from one condition to another according to the presence or absence of the film. In rewinding the film, a change in the position of this switch enables one to detect that the film with its leader is completely rewound into a cassette, so that the film rewind operation can be ended. However, the switch increases the cost of the device. Besides, it is difficult adequately to ensure the durability and reliability of the switch. In addition to these problems, the switch tends to be exposed to the adverse effect of dust or the like each time back cover of the camera is opened and thus has not been often used in cameras which attach great importance to reliability.

To solve these problems, another system uses a timer to measure the time required to move the leader of the film from the spool or sprocket in the film cassette. It also employs some means to detect the rotation of a member which responds to the device taking up one frame of the film at a time, i.e. a member which shifts its position every time one frame of film is taken up, such as the spool or sprocket which moves in response to a film winding operation or some other member that rotates with movement of the film. The timer begins counting when the spool or sprocket rotation detecting means no longer detects the rotation of the spool or sprocket during a film rewinding operation, and upon completion of the time count stops the film rewind operation.

However, even such a film rewind device presents problems. In some cases, the film is not tightly wound on a spool disposed within a cartridge, in a loosely wound or slackly coiled state. If the camera is loaded with such a slack coil of film and the film is rewound after exposing less than than total number of frames, and particularly only a few frames, the first few moments of the film rewind operation involves merely tightening or cancelling out the slackly coiled portion of film remaining inside the cartridge while the portion of film outside of the cartridge is not actually rewound at all. However, despite this condition, the timer begins to count time. Therefore, the time count operation of the timer tends to stop and automatically bring the film rewinding operation to an end before the film portion outside of the cartridge is completely rewound. The probability of such a slackly coiled state of film is particularly high with the film cartridges for 12 or 24 frame exposures.

Conceivable solutions of this problem include sufficiently lengthening the time counting period of the timer. In the case of a film which is not slackly coiled, however, that method results in a wasteful operation of a motor in terms of time and electrical energy and degradation of operability of the camera due to the time wasted and the noise resulting from the wasteful operation.

SUMMARY OF THE INVENTION

The present invention is directed to the solution of the problems of the prior art mentioned in the foregoing. It is therefore an object of the invention to provide a motor-driven film rewinding device of excellent operability, wherein a timer having a relatively long counting time is operated to cancel a slackly coiled state of film in the event of a film cartridge containing a slackly coiled film and another timer having a relatively short counting time is operated to shorten a wasteful operation of a motor after completion of film rewinding when there exists no slackly coiled state of film or when a slackly coiled state has been cancelled.

The above and further objects and features of the invention will become apparent from the following detailed description of preferred embodiment thereof taken in connection with the accompanying drawings.

BRIEF DESCRIPTION OF THE DRAWINGS

FIG. 3 is a block diagram showing the rewinding control circuit of the embodiment.

DETAILED DESCRIPTION OF THE PREFERRED EMBODIMENTS

Figure 1:
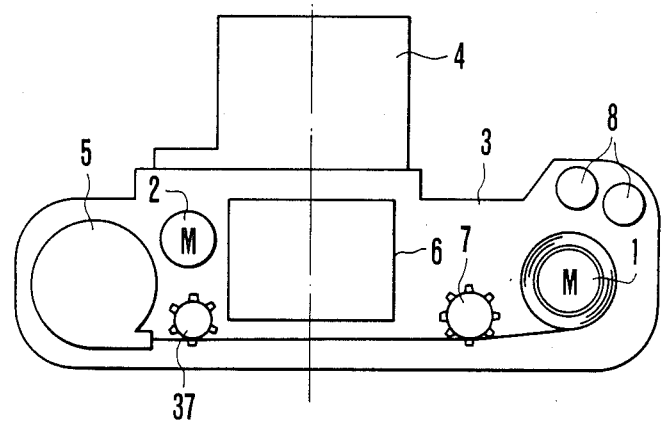
FIG. 1 is an upper side view showing an outline of a camera arranged as an embodiment of the invention.

FIG. 1 shows an outline of a camera arranged as an embodiment of the invention. The camera is provided with motors 1 and 2; a camera body 3; a lens 4; a cartridge 5; a mirror box 6; a film detection member 7; a battery 8; and a sprocket 37. The motor 1 is disposed within a spool. Since it is thus located close to the spool, the motor 1 is capable of driving the spool with a minimum arrangement of a reduction mechanism to permit efficient film winding. Further, as shown, another motor 2 is disposed in a space between a cartridge chamber and the mirror box 6 to have the rotation shaft thereof on the lens mounting side and in a direction perpendicular to the paper surface of the drawing. The motor 2 is arranged to drive the sprocket 37, to charge a shutter, etc. and to rewind the film. Since the motor 2 is disposed close to these parts to be driven, it can be arranged in combination with a minimum arrangement of a reduction mechanism and its driving force thus can be efficiently transmitted. Further, since the motor 2 is located on the side opposite to a grip part with the mirror box 6 interposed in between them, it never interferes with the grip part. Therefore, the battery 8 can be disposed within the grip part. The rewinding driving system is thus separately arranged from the winding driving thereby to enhance the driving efficiency of the embodiment.

Figure 2:
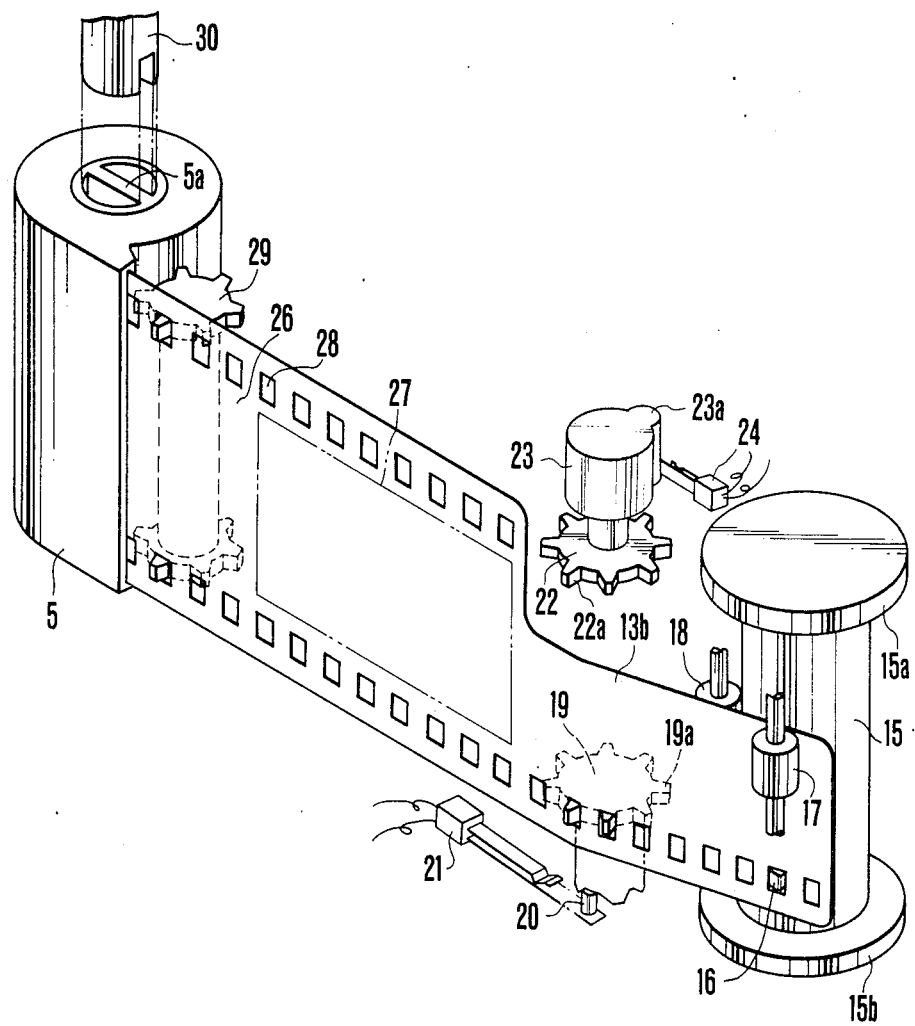
FIG. 2 is an oblique view showing a film in relation to the members of the camera participating in film feeding.

FIG. 2 shows in an oblique view the relation of the film to the members of the camera of FIG. 1 participating in feeding the film. A spool 15 arranged to take up the film and is provided with film guiding flanges 15a and 15b. A reference numeral 16 denotes a claw which engages the perforation of the film to have the film wound round the spool 15. The claw 16 is urged by a spring force to protrude outside of the periphery of the spool 16 and, therefore, can be pushed back to the periphery of the spool. A film retaining roller 17 which is provided on the back cover of the camera and another film retaining roller 18 which is provided on the camera body jointly serve to push the film against the spool 15 for automatic loading. A film detecting member 19 is provided with 8 projections 19a and is arranged to rotate with these projections 19a engaging the perforation of the film. A film movement detecting switch 21 is provided with a pin part 20 and is arranged to turn on and off as the film detecting member rotates with the pin part 20 caused to move up and down by the rotation of the film detecting member 19. With the rotation of the film detecting member 19 thus transmitted by the on-and-off operation of the switch 21, the status of movement of the film is displayed by a display device (not shown). Another film detecting member 22 is also provided with 8 projections 22a and is arranged to rotate with these projections 22a engaging the perforation 28 of the film. A film feed control member 23 is arranged to rotate together with the film detecting member 22 and is provided with a cam part 23a. The cam part 23a comes into contact with a film feed completion detecting switch 24 to turn it on when one frame portion of the film has been wound up and stays away from the switch 24 to leave it off when one frame portion of the film has not been wound up. The film is indicated by a reference numeral 26; one photographing picture frame portion of the film by a numeral 27; the above-stated perforation of the film 26 by a numeral 28; and sprockets by a numeral 29. A fork 30 is arranged to engage a cutout part 5a of a cartridge 5 and to wind up the film by rotating.

Next, referring to FIG. 3, the rewinding control circuit of the film rewinding device of this embodiment is arranged as described below:

The illustration of FIG. 3 includes a power supply battery 100; a pull-up resistor 101; a switch 102 which turns on in response to the operation of a film rewinding mode setting button (not shown) and to set the input of an inverter circuit 103 at a low (hereinafter called L) level; a D type flip-flop circuit 104 (hereinafter called D type FF) which receives the output of the inverter circuit 103 at the D input terminal thereof and pulses from a reference pulse oscillator 105 at the clock input terminal CLK thereof; an AND gate circuit 106 which receives the output of the inverter circuit 103 and the $\overline{Q}$ output of the D type FF 104 while the output terminal of the AND gate circuit is connected to the set input terminal of an RS type flip-flop circuit 107 (hereinafter called RS type FF) of a subsequent stage; a switching NPN transistor 116 which is arranged to turn on when the Q output of the RS type FF 107 is at a high (hereinafter called H) level; a PNP transistor 117 which is arranged to drive a motor 118 when it is turned on by the switching action of the NPN transistor 116; and resistors 113, 114 and 115 which are arranged to control the current or voltage values of these transistors. The motor 118 corresponds to the motor 2 of FIG. 1 and is connected to a film rewinding mechanism (not shown). The motor 118 is thus arranged to drive the film rewinding mechanism to rewind the film.

A counter circuit 112 is arranged to count the number of pulses produced from the reference pulse oscillator 105 when the reset input thereof is at an L level. The counter circuit 112 produces an H level output from the output terminal Qa thereof when a number of pulses of the reference pulse oscillator 105 corresponding to two seconds are counted. A reference numeral 130 denotes a pull-up resistor. A switch 131 is arranged to turn on in response to a film moving function (not shown) every time one frame portion of the film is fed and to supply an L level output to an inverter 124. This switch 131 corresponds to the film feed completion detecting switch 24 of FIG. 2. A numeral 132 denotes a pull-up resistor. A switch 133 is arranged to be responsive to the opening and closing operation of the back cover of the camera (not shown) and to produce an L level output by turning on when the back cover is closed. An up-down counter circuit 134 is arranged to count the shifts in the number of frames of the film. The counter circuit 134 has the clock input terminal thereof connected to the output terminal of the inverter 124, the reset input terminal to one terminal of the switch 133 and the up-down control input terminal to the Q output terminal of the RS type FF 107. Further, the up-down counter circuit 134 down counts when the input to the up-down control input terminal is at an H level and up counts when it is at an L level. A decimal decoder driver 135 receives a count number of the up-down counter circuit 134 from the output terminals Q0–Q5 of the latter via data input terminals D0–D5 thereof and is arranged to drive a 7-segment display device 136 to display the number of frames of the film after the data received via the data input terminals have been converted into codes. A D type FF 150 receives the output of the Q output terminal of the RS type FF 107 as a datum input and is arranged to latch the datum in response to a fall of a signal produced from the switch 131. A numeral 151 denotes an AND gate. A monostable multivibrator 152 is a circuit similar to the circuit which is formed jointly by the D type FF 104 and the AND gate 106. An OR gate circuit 125 has two inputs. One is the output of the Q output terminal of the RS type FF 107 coming via an inverter 123 and the other is the output of the switch 131 coming via an inverter 124. The OR gate circuit 125 is thus arranged to control the reset input of the counter circuit 112. Another OR gate circuit 126 has two inputs, one being the output of the Q output terminal of the RS type FF 107 which comes via an inverter 119 and the other the output Qa of the counter circuit 112. An RS type FF 127 has the reset input terminal thereof connected to the output terminal of the OR gate circuit 126 and the set input terminal thereof to the output terminal Qa of the counter circuit 112. An AND gate circuit 128 has two inputs, one being the output of the switch 131 coming via the inverter 124 and the other the output Q of the RS type FF 127.

Another RS type FF 129 has the set input terminal thereof connected to the output terminal of the AND gate circuit 128 and the reset input terminal thereof to one terminal of the switch 133. An AND gate circuit 109 has two inputs, one input being the output Qa of the counter circuit 112 and the other the output Q of the RS type FF 129. Another AND gate circuit 110 also has two inputs including the output Qb of the counter circuit 112. An OR gate circuit 108 has two inputs which are outputs of the AND gate circuits 109 and 110. The output terminal of the OR gate circuit 108 is connected to the reset input terminal of the RS type FF 107.

The embodiment of FIG. 3 operates as follows: In loading the camera with a film, the level of one terminal of the switch 133 becomes an H level when the back cover of the camera (not shown) is opened. This resets the up-down counter circuit 134. The outputs Q0–Q5 of the up-down counter circuit 134 all become L levels. The decoder driver 135 decodes them and drives the display device 136 to make a display of zero in Arabic numeral.

When the back cover is closed with the camera loaded with the film, the level of one terminal of the switch 133 becomes L to release the up-down counter circuit 134 from the reset state. At that time, since the film rewinding switch 102 is "off", the output of the inverter 103 is at an L level. The output of the AND gate circuit 106 is also at an L level and the set input of the RS type FF 107 is at an L level. Since the RS type FF 107 is arranged to be reset when the power supply is switched on, the output Q of the RS type FF 107 is at an L level at first and, accordingly, the motor 118 is in repose.

When a shutter release button is depressed for the purpose of photographing a scene, a series of release processes are performed. Upon completion of the photographic operation, one frame portion of the film is taken up by means of the motor 1 of FIG. 1. The switch 131 turns on and remains in that state for a predetermined period of time every time one frame portion of the film is fed or taken up. Therefore, a number of clock pulses corresponding to the number of frame portions of the film thus taken up are supplied to the clock input terminal of the up-down counter circuit 134. The up-down counter circuit 134 is in an up counting mode, because, as mentioned above, the output Q of the RS type FF 107 is at an L level and accordingly the up-down count control input of the up-down counter circuit 134 is also at an L level. Therefore, the up-down counter circuit 134 counts the number of input clock pulses corresponding to the number of fed frame portions of the film. A number of frames thus obtained is displayed at the display device 136 via the decoder driver 135. A film rewinding operation is performed as follows:

Let us assume that all the 24 frame portions of a film or 24 exposures have been used with the last frame portion of the film having been fed. In this instance, the film is not in a slackly coiled state as all the frame portions of it have been used. In this condition, when the rewinding button (not shown) is pushed, the rewinding switch 102 turns on. The output level of the inverter circuit 103 becomes H. At this point of time, the D type FF 104 has not yet read the H level of the D input thereof and, therefore, the output $\bar{Q}$ of the D type FF 104 is at an H level. Therefore, the output of the AND gate circuit 106 is at an H level. Accordingly, the RS type FF 107 assumes a set state to drive the motor 118 via the transistors 116 and 117. Then, with the pulses which are produced from the oscillator 105 supplied to the D input terminal of the D type FF 104, when the D type FF 104 reads the H level via the D input, the level of the output Q of the FF 104 becomes L. The level of the set input of the RS type FF 107 also becomes L. However, since the condition of the RS type FF 107 remains unchanged by this, the motor 118 remains in a driving state to rewind the film. At this time, since the reset input of the up-down counter circuit 134 is at an L level and the up-down control input thereof at an H level, the up-down counter circuit 134 is in a down-counting mode. Therefore, the circuit 134 down counts by receiving a number of the clock pulses corresponding to the number of the frame portions of film which have been fed. The display device 136 then displays this, for example, in such a manner as "24"→"23"→"22"→. . . .

Meanwhile, the operation of the counter circuit 112 in this rewinding mode is as follows: Since the output Q of the RS type FF 107 is at an H level, one of the inputs of the OR gate circuit 125 is at an L level. Further, before one frame portion of the film is first moved in the film rewinding mode, the camera is in a condition of having completed the film winding action; therefore, the switch 31 is on; the input of the inverter 124 is at an L level; the output of the monostable multivibrator 152 is at an L level; the output of the AND gate 151 is at an L level; and the other input of the OR gate circuit 125 is also at an L level. Therefore, the reset input of the counter circuit 112 is at an L level to have the counter circuit 112 in a counting state. The counter circuit 112 thus counts the reference pulses of the oscillator circuit 105. However, the switch 131 turns on every time one frame portion of film is rewound. Then, a signal which changes from an H level to an L level when the switch 131 turns on is supplied via the inverter 124 to the monostable multivibrator 152. This causes the monostable multivibrator 152 to produce a signal which remains at an H level for a predetermined period of time. This signal or pulse from the monostable multibivrator 152 is supplied via the AND gate circuit 151 and the OR gate circuit 125 to the reset input terminal of the counter circuit 112. Therefore, the counter circuit 112 is reset every time this pulse of the monostable multivibrator 152 is supplied.

In the film rewinding mode, the operation of the RS type FF 129 is as follows: Since the RS type FF 127 is in a set state, the output Q thereof is at an H level. The RS type FF 129 is in a state of being set by the output Q of the D type FF 150 which latches the H level signal of the RS type FF 107 due to the pulse input from the switch 131 coming via the AND gate circuit 128. Therefore, the output Q of the RS type FF 129 is at an H level. The film begins to be rewound the instant the switch 102 turns on. Since the film is not in a slackly coiled state in this case, the movement of the film never comes to a stop until completion of rewinding for all frame portions thereof. Upon completion of film rewinding operation, the reset input of the counter circuit 112 remains at an L level with the switch 31 being not turned. Under this condition, the counter circuit 112 is never reset and remains operative. Then, when the counter circuit 112 counts a number of clock pulses of the oscillation circuit 105 corresponding to a real time value of 2 seconds, the level of the output Qa of the circuit 112 becomes an H level. This causes the output level of the AND gate circuit 109 to become H. The RS type FF 107 is reset. The transistors 116 and 117 turn off. The rotation of the motor 118, therefore, comes to a stop to terminate the rewinding mode.

In the event that the film is in a slackly coiled state and the film is to be rewound in a state of having been used only halfway, the film rewinding operation of the embodiment is as follows: When an L level input is supplied to the input terminal of the inverter circuit 103 with the rewinding switch 102 operated in the above-stated manner, the motor 118 rotates to start a film rewinding operation. However, with the film in the slackly coiled state, the portion of the film which has been pulled out of the cartridge is not actually rewound until the slackly coiled state of the film disappears. Then, during this period, the position of the switch 24 shown in FIG. 2 remains unchanged from the winding completed state and the input of the inverter circuit 124 stays at an L level. Accordingly, the output of the OR gate circuit 125 is kept at an L level through the AND gate circuit 151. The counter circuit 112 is thus kept in a counting state. When the count number of the counter circuit 112 reaches a value corresponding to two seconds, the level of the output Qa of the counter circuit 112 becomes H. Meanwhile, since the film is not moved during this period, the switch 131 does not turn off and the inverter circuit 124 continues to produce the H level output. The D type FF 105 does not latch the output Q of the RS type FF 107 and continues to produce an L level signal. The output of the AND gate circuit 128 is therefore at an L level. However, if the slackly coiled state of the film is cancelled within the period of two seconds, the rotation of the motor 118 comes to move the pulled out portion of the film. This movement of the film turns off the switch 131 to cause the AND gate 151 to produce an H level pulse. The H level pulse output of the AND gate circuit 151 causes the D type FF 105 to latch the output Q of the RS type FF 107 and to produce an H level signal. Therefore, the RS type FF 129 is set via the AND gate circuit 128 and the level of the output Q of the RS type FF 129 becomes H. Accordingly, two seconds after completion of film rewinding, the level of the output Qa of the counter circuit 112 becomes H to reset the RS type FF 107. The rotation of the motor 118 then comes to a stop to bring film rewinding to a stop.

If the slackly coiled state of film is not cancelled within the period of two seconds, the output Q of the RS type FF 129 remains at the L level. When the switch 21 is used, it is possible to obtain a signal for turning the switch even when the rewinding is started in the course of the film winding process. At this time, the output Qa of the counter circuit 112 is at an H level and the output Qb thereof at an L level. Accordingly, the output of the OR gate circuit 108 is at an L level. The RS type FF 107 is thus not reset. The motor 118 is thus allowed to continuously rotate to cancel the slackly coiled state of film. Then, it is after the lapse of 10 seconds after the commencement of the rotation of the motor 118 when the level of the output Qb of the counter circuit 112 becomes an H level to reset the RS type FF 107 and thus to bring the rotation of the motor to a stop. Almost any slackly coiled state of film can be cancelled within this period. With the slackly coiled state thus cancelled, the film is moved and the RS type FF 129 is set. After completion of film rewinding, the rotation of the motor 118 comes to an end when the level of the output Qa of the counter circuit becomes H, i.e. two seconds after completion of rewinding.

According to the arrangement of this embodiment, any slackly coiled state of film is cancelled by virtue of a prolonged timer time in the event of a slackly coiled state of film. In cases where there is no slackly coiled state or where a slackly coiled state is cancelled within a short period of time, a shorter timer time is employed, so that film rewinding can be reliably carried out without wasting energy and time. In this specific embodiment, the switch 124 shown in FIG. 3 is employed as means for detecting the movement of the film. However, this switch may be replaced with the switch 21 of FIG. 2. The members participating in feeding the film are also not limited to those shown in FIG. 2 but may be replaced with different kinds of members. Further, while the reference pulse oscillator or generator 105 and the counter circuit 112 are arranged to form the timer circuit, the timer circuit may be replaced with a circuit utilizing a CR time constant.

Figure 4:
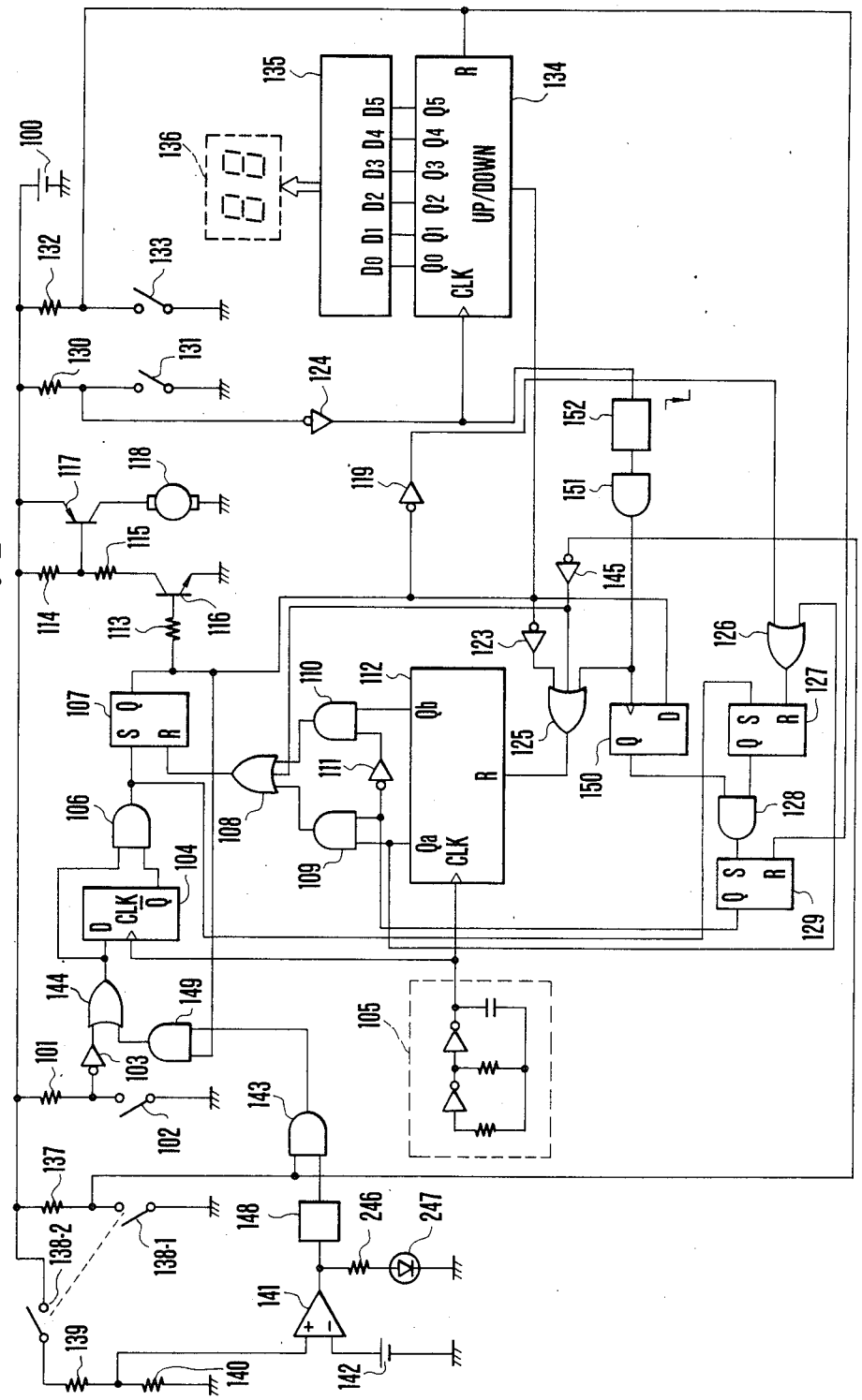
FIG. 4 is a block diagram showing the rewinding control circuit of another embodiment of the invention.

FIG. 4 shows another embodiment of the invention wherein a film rewinding device is arranged in combination with a battery checker. In the case of this embodiment, when the photographer checks the power supply battery to find whether or not the capacity of the battery is sufficient for film rewinding because of a low film rewinding speed found during the process of a film rewinding operation, the rewinding operation is arranged to be held in abeyance while a battery check button is under a depressing operation and to be resumed the instant the button is released from the depressing operation only when the capacity in question is found sufficient. If the capacity is found insufficient, film rewinding operation is prohibited. In FIG. 4, the same circuit elements as those of FIG. 3 are indicated by the same reference numerals and their operations are omitted from the description given here. The illustration of FIG. 4 includes a pull-down resistor 137; battery checking switches 138-1 and 138-2 which are arranged to turn on in response to a battery check operation; resistors 139 and 140 which are arranged to have voltage impressed thereon only at the time of battery check and to have such resistance values that impose a sufficient load on the power supply battery on the occasion of battery check; a comparator 141 which compares the voltage of the power supply battery 100 which is voltage divided by the resistors 139 and 140 with a reference voltage obtained from a reference voltage source 142; a resistor 146; an LED 147 which is arranged to light up when the result of the battery check is satisfactory; an AND gate 143; an OR gate 144; an inverter 145 which produces an H level signal when the switch 138-1 turns on with the battery check performed; a delay circuit 148; an AND gate 149 which is arranged to have an H level signal supplied to the OR gate 144 only during the process of film rewinding; and a D type flip-flop 150 which is arranged to detect the actual movement of the film after the RS type FF is set. When the switch 102 is turned on for film rewinding, the RS type FF 107 is set and the film is rewound as mentioned in the foregoing. The output level of the inverter 145 then becomes H. The RS type FF 107 is reset and the level of its output Q becomes L. The transistor 116 turns off. The transistor 117 also turns off. The rotation of the motor 118 comes to a stop to suspend film rewinding. At the same time, the counter circuit 112 is also reset.

In case that there is a sufficient power supply voltage at the time of battery check, the output of the comparator 141 is at an H level and, accordingly, the LED 147 lights up. Then, when the photographer turns off the switches 138-1 and 138-2 to end battery check, the output level of the comparator 141 changes from H to L. However, at that time, the AND gate 143 continues to produce an H level output for a length of time delayed by the delay circuit 148. Then, in the same manner as when the film rewinding button is depressed, the RS type FF 107 is set by a circuit consisting of the D type FF 104 and the AND gate 106 and the film rewinding operation is resumed. If the power supply voltage is insufficient when the battery check is made, the output of the comparator 141 is at an L level. Therefore, the LED 147 does not light up. The circuit consisting of the D type FF 104 and the AND gate 106 does not set the RS type FF to leave it in a reset state. Therefore, the film rewinding operation is not performed.

In the case of this embodiment, the motor-driven film rewinding operation is automatically suspended when the battery check switch is turned on during the process of film rewinding. The battery, therefore, can be prevented from being checked in an overloaded condition. This arrangement permits accurate battery check as it precludes the possibility that the battery is misjudged as inadequate while it is actually in an adequate condition. Therefore, in the event that film rewinding is not carried out with the film rewinding motor not normally rotating due to some abnormality, the photographer can make accurate battery check without manually stopping the film rewinding operation. Then, the result of battery check enables the photographer to immediately determine whether the failure of the normal motor-driven film rewinding operation is attributable to the inadequacy of the battery or to some other reason. In the event of the former, the motor-driven film rewinding operation can be resumed in a normal manner by replacing the battery. Further, if the battery is found good, the rewinding operation is automatically resumable by just returning the battery check switch to its original state from its "on" position.

What is claimed is:

1. A motor-driven film rewinding device for a camera, comprising:
   (a) film rewinding means for rewinding a coil of film wound up on a film take-up spool of the camera;
   (b) film movement detecting means for producing a signal which shifts alternately between a first state and a second state as the film moves:
   (c) timer means, arranged to be reset according to the shift of the signal produced from said film movement detecting means, for producing a signal upon completion of a time measuring operation carried out for a predetermined period of time, said timer means including
   a timer circuit which performs a time measurement from the start of an operation of said film rewinding means for a short period of time when the signal of said film movement detecting means shifts and for a long period of time when said signal does not shift; and
   (d) control means for rendering said film rewinding means inoperative according to said signal produced from said timer means.

2. A device according to claim 1, wherein said timer means further includes:
   (a) a reference clock pulse generator;
   (b) a counter which counts clock pulses produced from said reference clock pulse generator and is arranged to produce a first frequency divided output obtained by frequency dividing the clock output of said reference clock pulse generator and a second frequency divided output which is longer than said first frequency divided output;
   (c) latch means, arranged to detect a shift of said signal produced from said film movement detecting means, for latching the signal upon detection of the shift; and
   (d) selection means for selecting said second frequency divided output according to the signal latched by said latch means and selecting said first frequency divided output when no signal is latched by said latch means.

3. A device according to claim 1, wherein said film movement detecting means includes: perforation detecting means which shifts alternately between first state and a second state according to the movement of perforation provided in the film.

4. A device according to claim 3, said perforation detecting means includes:
   (a) a film sensor member arranged to rotate as the perforation of film moves;
   (b) a cam member arranged to rotate in association with said film sensor member; and
   (c) a switch which shifts the position thereof in response to said cam member.

5. A device according to claim 1, wherein said film movement detecting means includes: perforation detecting means for detecting the movement of perforation of the film to produce a signal which shifts from a first state to a second state according to a shift of the film to the extent of one frame portion thereof.

6. A device according to claim 5, wherein said perforation detecting means includes:
   (a) a film sensor member arranged to rotate as the perforation of the film moves;
   (b) a cam member responsive to said film sensor member, said cam member being arranged to make one turn every time the film moves to an extent of one frame portion of the film, said cam member being provided with a cam projection located in a predetermined position; and
   (c) a switch arranged to be shifted by the cam projection of said cam member from a first state to a second state.

7. A motor-driven film rewinding device for a camera, comprising:
   (a) motor-driven film rewinding means for rewinding a coil of film;
   (b) signal producing means, arranged to detect the movement of the film, for producing an intermittent signal indicative of the movement of film;
   (c) timer means for producing a signal after measuring a short period of time from the start of an operation of the motor driven film rewinding means when the movement of film is detected by said signal producing means, said timer means being arranged to produce a signal after measuring a period of time longer than the short period of time when no movement of film is detected and to be reset by the signal of said signal producing means; and
   (d) control means for rendering said rewinding means inoperative in response to the signal produced from said timer means.

8. A motor-driven film rewinding device for a camera, comprising:
   (a) motor-driven film rewinding means for rewinding a coil of film;

(b) film movement detecting means for detecting movement of said film;

(c) timer means for producing a signal after measuring a predetermined period of time from the start of an operation of said film rewinding means in response to detection of no film movement by said film movement detecting means, said timer means being arranged to shorten said predetermined period of time in response to detection of film movement by said film movement detecting means; and (d) control means for rendering said rewinding means inoperative in response to the signal produced from said timer means.

9. A device according to claim 8, wherein said film movement detecting means includes signal generating means for generating a signal which shifts alternately between a first state and a second state according as said film moves; and said timer means includes a timer circuit arranged to measure a predetermined period of time and to be reset according to the shift of the signal generated by said signal generating means, said timer circuit being arranged to shorten said predetermined period of time by being reset at least once.

10. A film rewinding apparatus for a camera, comprising:

(a) detecting means, operatively coupled with the film, for producing a warning signal when the film is in a slackly coiled state by detecting the state of the film within a film cartridge;

(b) time defining means responsive to start of film rewind for starting to count time and for producing a warning signal after the time required to rewind the film by a prescribed amount has been counted; and (c) time changing means, connected to said time defining means, for lengthening said first rewinding time in response to said warning signal.

11. A film rewinding apparatus according to claim 10, wherein detecting means includes:

(a) film travel detecting means, coupled with the film, for producing a signal in sequence in response to the travel of the film; and (b) means for producing the warning signal in the event that no signal is produced from the film travel detecting means within a predetermined period of time after commencement of a film rewinding operation, said warning signal producing means being connected to the film travel detecting means.

12. An apparatus as in claim 10, further comprising means for stopping the operation of said film rewinding apparatus in response to said warning signal.

13. An apparatus as in claim 11, further comprising means for stopping the operation of said film rewinding apparatus in response to said warning signal.

14. A motor driven device for advancing a film in a camera, comprising:

(a) film advancing means for advancing the film;

(b) a motor operating as a torque source for said film advancing means;

(c) signal producing means for detecting movement of said film and for producing an advance signal indicative of the movement of said film;

(d) first timer means for detecting whether said advance signal is produced by said signal producing means, said first timer means producing a first non-advance detecting signal when said first advance signal is not produced within a first predetermined time;

(e) second timer means for detecting whether said advance signal is produced by said signal producing means, said second timer means producing a second non-advance signal when said advance signal is not produced within a second predetermined time, and said second time being set shorter than said first time;

(f) first motor control means for causing said motor to start to rotate in a first rotation direction from a stopped state;

(g) second motor control means for preventing the rotation of said motor in said first rotation direction in response to generation of said first or second non-advance detecting signal, said second motor control means starting a control operation thereof with the start of rotation of said motor by said first motor control means; and (g-1) said second motor control means detecting an advance of the film through said first timer means at the time of the start of rotation of said motor, and preventing the rotation in the first rotation direction of said motor at the time when said first non-advance detecting signal is produced from said first timer means; and (g-2) said second motor control means changing over from said first timer means to said second timer means when said advance signal is produced from said signal producing means after the start of rotation of said motor to detect the advance of said film through said second timer means, and preventing the rotation in said rotation direction of said motor when said second non-advance detecting signal is produced from said second timer means.

15. A device according to claim 14, wherein said signal producing means produces said advance signal every time said film moves a predetermined amount.

16. A device according to claim 14, wherein said signal producing mean produces said advance signal every time the film moves an amount not less than one frame of the film.

17. A device according claim 14, wherein said signal producing means includes a rotary wheel which is rotated by the movement of perforations of the film, said rotary wheel producing said advance signal for indicating movement of the film when it rotates.

* * * * *